(12) United States Patent
Ono et al.

(10) Patent No.: US 12,112,018 B2
(45) Date of Patent: Oct. 8, 2024

(54) INFORMATION DISPLAYING DEVICE AND METHOD FOR DISPLAYING INFORMATION

(71) Applicant: Faurecia Clarion Electronics Co., Ltd., Saitama (JP)

(72) Inventors: Haruki Ono, Saitama (JP); Kazunori Sato, Saitama (JP); Kazuya Ninomiya, Saitama (JP); Shingo Takei, Saitama (JP); Taishin Konishi, Saitama (JP); Toshiyuki Takatani, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 18/119,108

(22) Filed: Mar. 8, 2023

(65) Prior Publication Data

US 2023/0315259 A1 Oct. 5, 2023

(30) Foreign Application Priority Data

Mar. 29, 2022 (JP) ................................ 2022-053301

(51) Int. Cl.
*G06F 3/0482* (2013.01)
*G06F 3/0484* (2022.01)
*G06F 3/16* (2006.01)

(52) U.S. Cl.
CPC .......... *G06F 3/0482* (2013.01); *G06F 3/0484* (2013.01); *G06F 3/167* (2013.01); *G06F 2203/04803* (2013.01)

(58) Field of Classification Search
CPC ....... G06F 3/0482; G06F 3/0484; G06F 3/167
See application file for complete search history.

(56) References Cited

U.S. PATENT DOCUMENTS 5,870,090 A * 2/1999 Takai .................. G06F 3/04842
715/788
6,426,761 B1 * 7/2002 Kanevsky ............. G06F 3/0481
715/764

(Continued)

FOREIGN PATENT DOCUMENTS

| JP | 2006-315597 A | 11/2006 |
| JP | 2008-040596 A | 2/2008 |
| JP | 2008-062737 A | 3/2008 |

*Primary Examiner* — William L Bashore
*Assistant Examiner* — Gregory A Distefano
(74) *Attorney, Agent, or Firm* — Volpe Koenig

(57) ABSTRACT

An information displaying device comprises: an input unit that receives operations from a user; a movement state evaluating unit that evaluates a state of movement of the mobile entity; a display information generating unit that generates screen information including UI elements (user interface elements) to be displayed on a display, based on a layout selected from layouts according to the evaluated state of movement of the mobile entity; and an operation detecting unit that detects the operations on each of the UI elements, and counts frequency of the operations on each of the UI elements while the movement state evaluating unit evaluates that the mobile entity is traveling; wherein, in the screen information based on the layout selected when the mobile entity is traveling, the UI elements with higher frequencies of the operations, which are detected by the operation detecting unit, are preferentially displayed on the screen of the display.

7 Claims, 7 Drawing Sheets

(56) References Cited

U.S. PATENT DOCUMENTS

| | | | |
|---|---|---|---|
| 2004/0176906 A1* | 9/2004 | Matsubara | G01C 21/3691 340/995.19 |
| 2006/0256094 A1 | 11/2006 | Inagaki | |
| 2011/0072492 A1* | 3/2011 | Mohler | H04L 67/54 715/765 |
| 2013/0111403 A1* | 5/2013 | Nakamura | G06F 3/0482 715/810 |
| 2013/0132900 A1* | 5/2013 | Peterson | G06F 3/04817 715/811 |
| 2013/0151963 A1* | 6/2013 | Costenaro | G06F 9/453 715/711 |
| 2013/0227488 A1* | 8/2013 | Tomar | G06F 3/0482 715/835 |
| 2014/0359456 A1* | 12/2014 | Thiele | H04W 4/18 715/735 |
| 2020/0339142 A1* | 10/2020 | Aggarwal | G06F 3/167 |

* cited by examiner

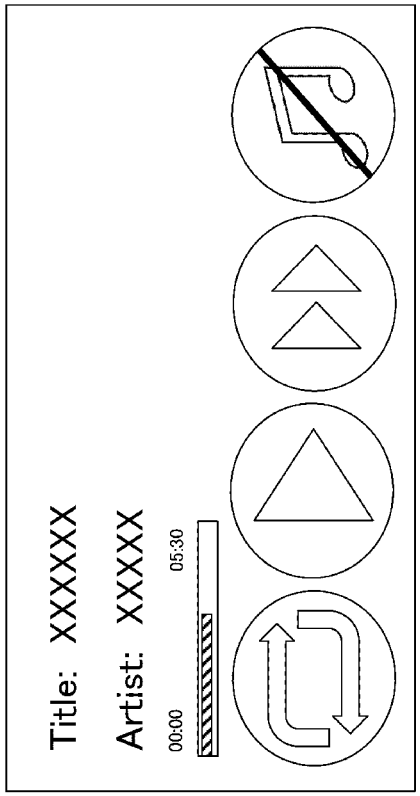
FIG.2B  Travel Layout
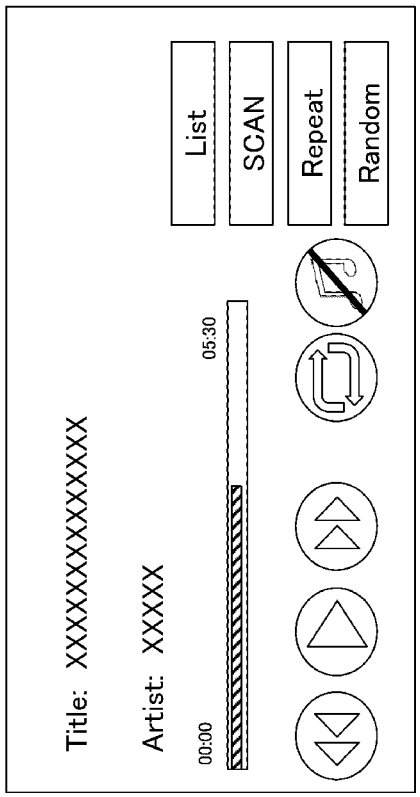
FIG.2A  Basic Layout
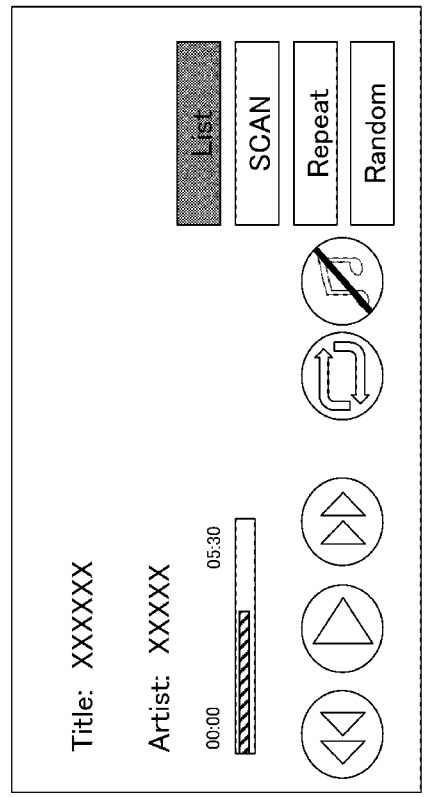
FIG.2C  Travel Basic Layout

INFORMATION DISPLAYING DEVICE AND METHOD FOR DISPLAYING INFORMATION

FIELD OF INVENTION

The present invention relates to an information displaying device and a method for displaying information.

BACKGROUND

Patent Document 1 relates to a vehicle-mounted displaying device, disclosing: "A car navigation system comprises a displaying device that has a touch screen on the front face of a liquid crystal displaying device, a voice outputting device, a control device for controlling said devices, and the like. The control device determines whether the host vehicle is traveling or stopped, and when displaying an input settings screen on the liquid crystal displaying device, performs the display in a normal display mode while the vehicle is stopped, or displays in a limited display mode, wherein the amount of text that is displayed on the liquid crystal displaying device is limited, if the vehicle is traveling. In the limited display mode, of a plurality of alternatives that structure a list, only a single item is displayed together with the cursor, and only that item can be selected. In this case, large regions that include cursor movement keys S1 and S2 are defined as movement instruction sensing regions C1 and C2, and the region of the list as a whole is defined as a sensing region A for designating a selection. After t seconds have elapsed following display of the item, the item is read out through the voice outputting device."

PRIOR ART DOCUMENTS

Patent Documents

[Patent Document 1] JP 2006-315597 A

SUMMARY

In a vehicle-mounted device such as a navigation device, there are limitations on the amount of text in character strings that are displayed on the display during travel, limitations on the display of user interfaces that do not accept operations during travel, and the like, in compliance with standards for constraining displays during travel.

With regard to such display constraints, there are problems with ease of use given that the ease of use remains the same regardless of whether or not the vehicle is traveling, because even when the display or operation is limited while traveling, still the basic layout is maintained, and the UI elements for which operations are disabled are merely disabled.

Moreover, even with the vehicle-mounted displaying device described in Patent Document 1, only the items that can be selected are limited in the limited display mode during travel, without changing the basic layout of the display, with no thought given to displaying so as to improve ease of use during travel.

Given this, the object of the present invention is to further improve the ease of use of UI elements that are usable when in motion.

Means for Solving the Problem

While the present application includes a plurality of means for solving, at least in part, the problem set forth above, an example thereof includes the following.

An information displaying device according to one aspect of the present invention, for solving the problem set forth above, comprises: an input unit that receives operations from a user; a movement state evaluating unit that evaluates a state of movement of the mobile entity; a display information generating unit that generates screen information including a plurality of UI elements (user interface elements) to be displayed on a display of the information displaying device, based on a layout selected from predetermined layouts according to the evaluated state of movement of the mobile entity; and an operation detecting unit that detects the operations on each of the UI elements, and counts frequency of the operations on each of the UI elements while the movement state evaluating unit evaluates that the mobile entity is traveling; wherein, in the screen information based on the layout selected when the mobile entity is traveling, the UI elements with higher frequencies of the operations, which are detected by the operation detecting unit, are preferentially displayed on the screen of the display.

Effects of the Invention

The present invention enables an improvement in the ease of use of UI elements that can be used when in motion.

Other objects, structures, effects, and the like, will become apparent through explanations of embodiments, below.

BRIEF DESCRIPTIONS OF THE DRAWINGS

FIG. 1 is a diagram showing an example of a schematic structure of an information displaying device.

FIG. 2A is a diagram showing an example of a basic layout. FIG. 2 B is a diagram showing an example of a travel layout. FIG. 2 C is a diagram showing an example of the basic travel layout.

FIGS. 6A through D are diagrams showing example screens wherein screen information is displayed in split regions.

Figure 7:
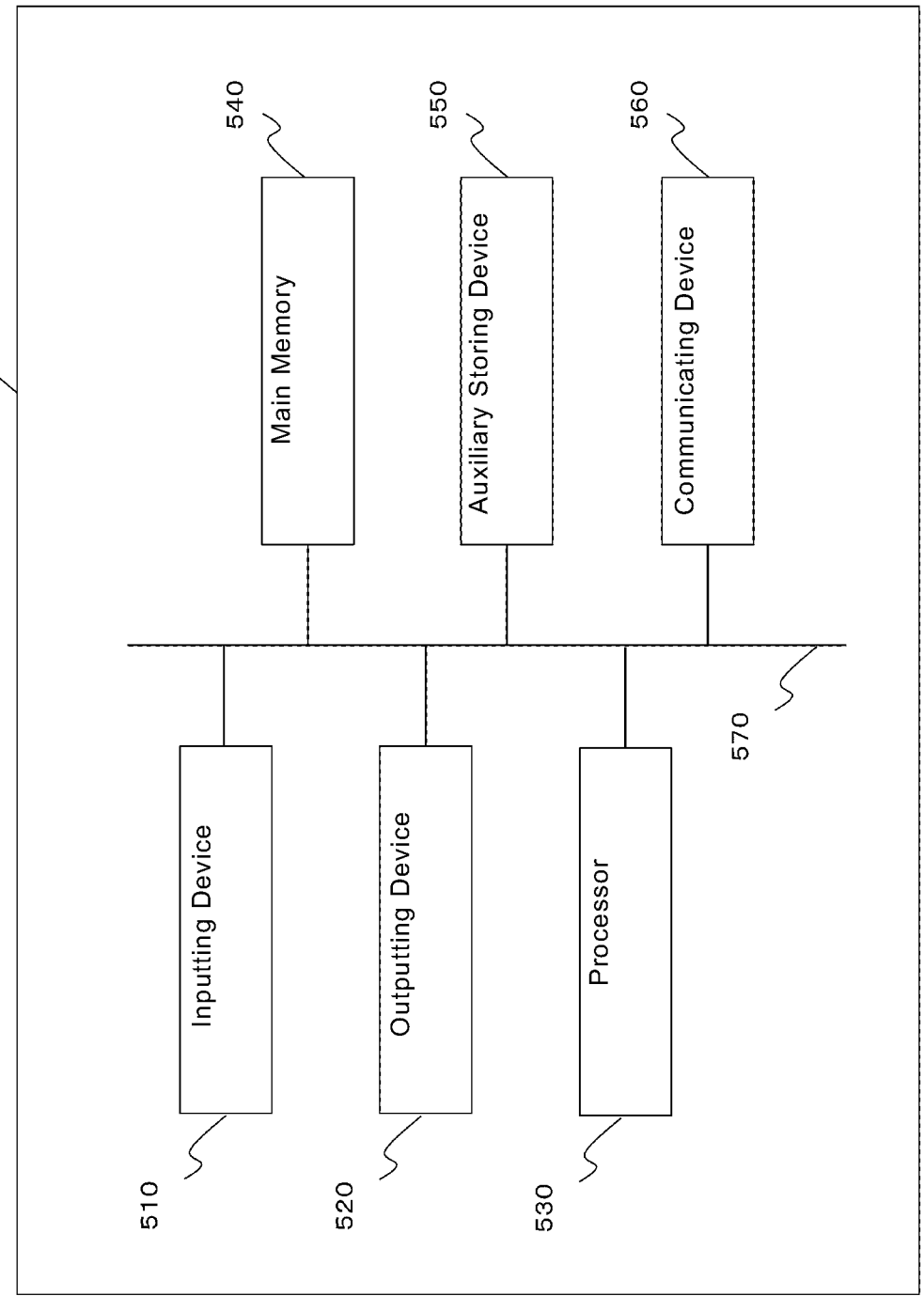

FIG. 7 is a diagram showing an example of a hardware structure for an information displaying device.

FORMS FOR CARRYING OUT THE PRESENT INVENTION

The present invention will be explained below using drawings for the individual embodiments.

DETAILED DESCRIPTION OF THE PREFERRED EMBODIMENTS

First Embodiment

In the present embodiment, the explanation will be for an example wherein a vehicle is used as a mobile entity.

Figure 1:
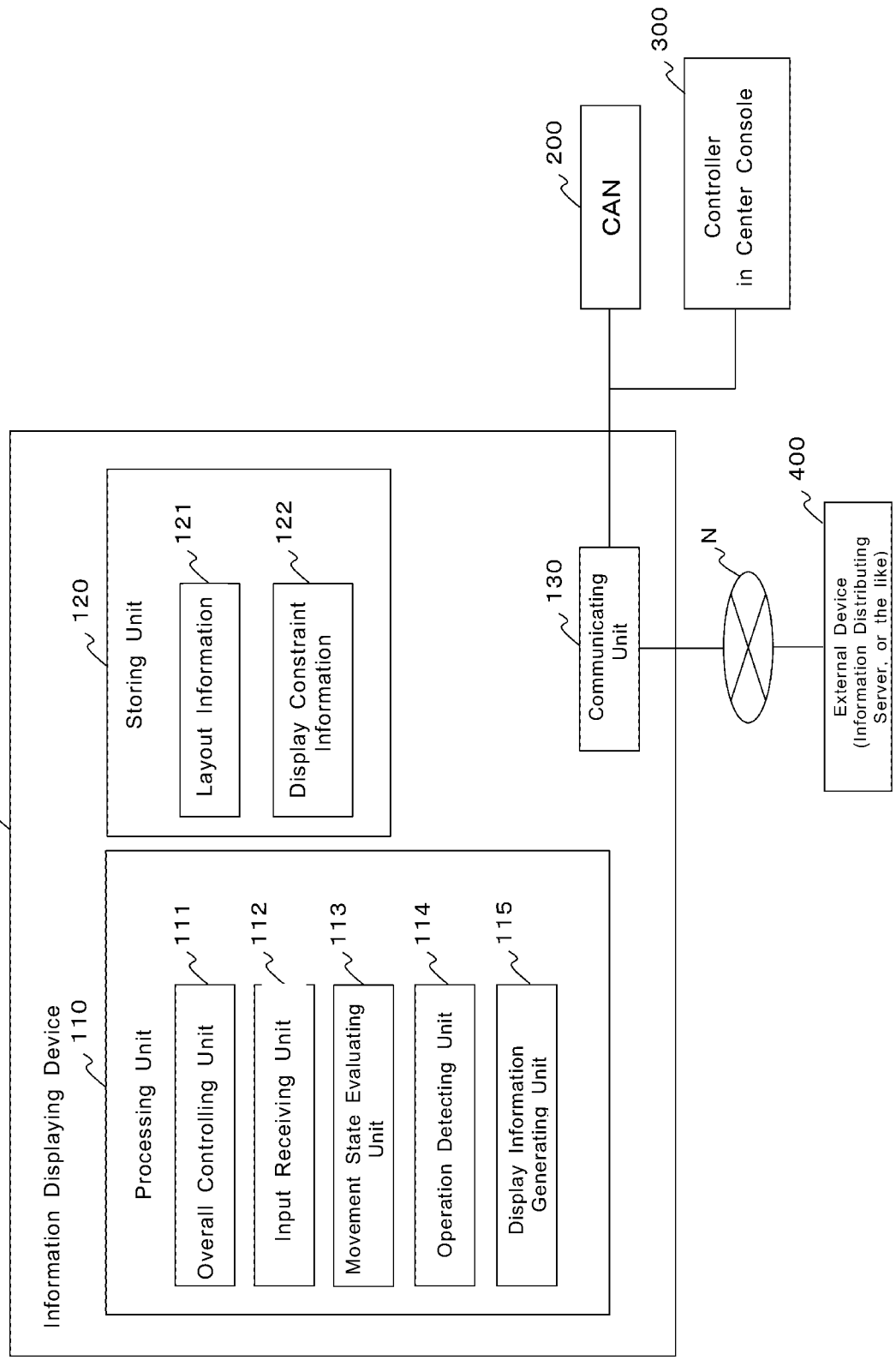

FIG. 1 is a diagram showing an example of a schematic configuration for an information displaying device 100 according to the current embodiment. The information displaying device 100 is a vehicle infotainment unit that is installed with application software (which may be termed an "application," below) for achieving, for example, navigation functions such as displaying map information, providing route guidance using map information, or the like, or achieving audio functions and telephone functions. Note that the information displaying device 100 may be a navigation device that is specialized for navigation functions for providing route guidance or displaying road traffic information, or instead may be a smart phone or tablet terminal installed with applications for executing a variety of functions.

If the vehicle in which the information displaying device 100 according to the present embodiment is installed is moving (traveling), the information displaying device 100 according to the present embodiment displays, on a display, screen information of a "travel layout" that displays a prescribed number of UI elements (In this specification, the term "UI element" means a manipulation element displayed in the user interface screen, for example, an icon or a button) that are used frequently during travel. The information displaying device 100 improves the ease of use during travel by displaying such user interface screen including the UI elements.

In order to execute the processes set forth above, the information displaying device 100 has a processing unit 110, a storing unit 120, and a communicating unit 130.

The processing unit 110 is a functional unit for carrying out a variety of processes that are executed by the information displaying device 100. Specifically, the processing unit 110 has an overall controlling unit 111, an input receiving unit 112, a movement state evaluating unit 113, an operation detecting unit 114, and a display information generating unit 115.

The overall controlling unit 111 is a functional unit for controlling coordination of the various functional units or the processes of the various functional units. Moreover, the overall controlling unit 111 turns the power supply ON or OFF for the information displaying device 100 depending on the ON/OFF state of the ignition key of the vehicle.

The input receiving unit 112 is a functional unit for receiving input information (including command inputs by the user) from the user through an inputting device (for example, a touch panel or hardware switches mounted in the information displaying device 100, a controller 300 provided in the center console of the vehicle, or the like).

The movement state evaluating unit 113 is a functional unit for evaluating the state of movement of the mobile entity. Specifically, the movement state evaluating unit 113 evaluates the state of movement (state of travel) of the vehicle that is the mobile entity as either "traveling" or "stopped." More specifically, the movement state evaluating unit 113 evaluates that the vehicle is traveling when a communicating unit 130 acquires information through a CAN (Controller Area Network) 200 indicating a vehicle speed pulse output. On the other hand, if the communicating unit 130 has not received information indicating vehicle speed pulse outputs, the movement state evaluating unit 113 evaluates that the vehicle is stopped.

The operation detecting unit 114 is a functional unit for detecting operations (touch operations on a touch panel or selection operations using hardware switches or the controller 300) for UI elements that are included in a prescribed layout that is displayed on the display. Specifically, the operation detecting unit 114 detects use of a UI element during travel, and counts (increments) the use frequency of that UI element. More specifically, the operation detecting unit 114 identifies the UI element for which use during travel has been detected, and increments the use frequency for that UI element and stores that use frequency in a storing unit 120.

The display information generating unit 115 is a functional unit for generating screen information (display information) to be displayed on the display. Specifically, the display information generating unit 115 generates screen information to be displayed on the display in accordance with a prescribed layout depending on the state of travel of the vehicle, using layout information 121 that is stored in the storing unit 120, relating to prescribed functions that can be used by the user (for example, menu displaying functions and various types of functions such as audio functions and telephone functions).

More specifically, if the vehicle is stopped, the display information generating unit 115 generates screen information to be displayed on the display in accordance with a basic layout that corresponds to the functions that can be used. Moreover, if the vehicle is traveling, the display information generating unit 115 generates screen information to be displayed on the display following a layout for when traveling (hereinafter termed the "travel layout") that corresponds to functions that can be used when traveling. Moreover, when an instruction to display the basic layout is received from a user during travel, the display information generating unit 115 generates screen information for displaying on the display following a basic layout for when traveling (hereinafter termed the "travel basic layout") that corresponds to the functions that can be used.

Note that the basic layout is the layout for screen information that is displayed when the vehicle is stopped, a layout that is not limited by the display limitations.

FIG. 2A is a diagram showing an example of a basic layout (for a case wherein the usable functions are audio functions). As shown in the diagram, the basic layout is a basic layout that is not limited by the display limitations, and is displayed when, for example, the vehicle is stopped.

Moreover, the travel layout is a layout for improving the convenience of operations when traveling, a layout for screen information that displays a prescribed number of UI elements with the highest frequency of use during travel.

FIG. 2 B is a diagram showing an example of a travel layout (for a case wherein the usable functions are audio functions). As shown in the diagram, the travel layout is a layout wherein a prescribed number of UI elements (which, in the example that is illustrated, is 4) with the highest use frequencies during use are displayed with priority.

Note that when compared to the basic layout, the number of UI elements displayed in the travel layout is fewer, and they are displayed with a larger size. Moreover, when compared to the basic layout, the amount of text in the character strings in the travel layout is reduced, and the characters are displayed in a larger size.

Moreover, although the travel basic layout is the same layout as the basic layout, this is a layout wherein the amount of text in the character strings displayed is limited (reduced), and those UI elements that cannot be used, due to display limitations during travel, are grayed out. Note that when compared to the travel layout, a greater number of UI elements (more types of UI elements) are displayed as UI elements that can be used.

FIG. 2 C is a diagram showing an example of a travel basic layout (for a case wherein the usable functions are audio functions). As illustrated, the travel basic layout has the same layout structure as the basic layout, but is a layout that is displayed during travel based on a user instruction, and thus the amount of text in the character strings that are displayed is limited by display limitations, and UI elements that cannot be used are displayed grayed out.

The display information generating unit 115 identifies, from layout information 121 in the storing unit 120, the layout that corresponds to the functions that can be used, and the layout thereof depending on the travel state and user instructions, and generates screen information based on the identified layout.

Figure 3:
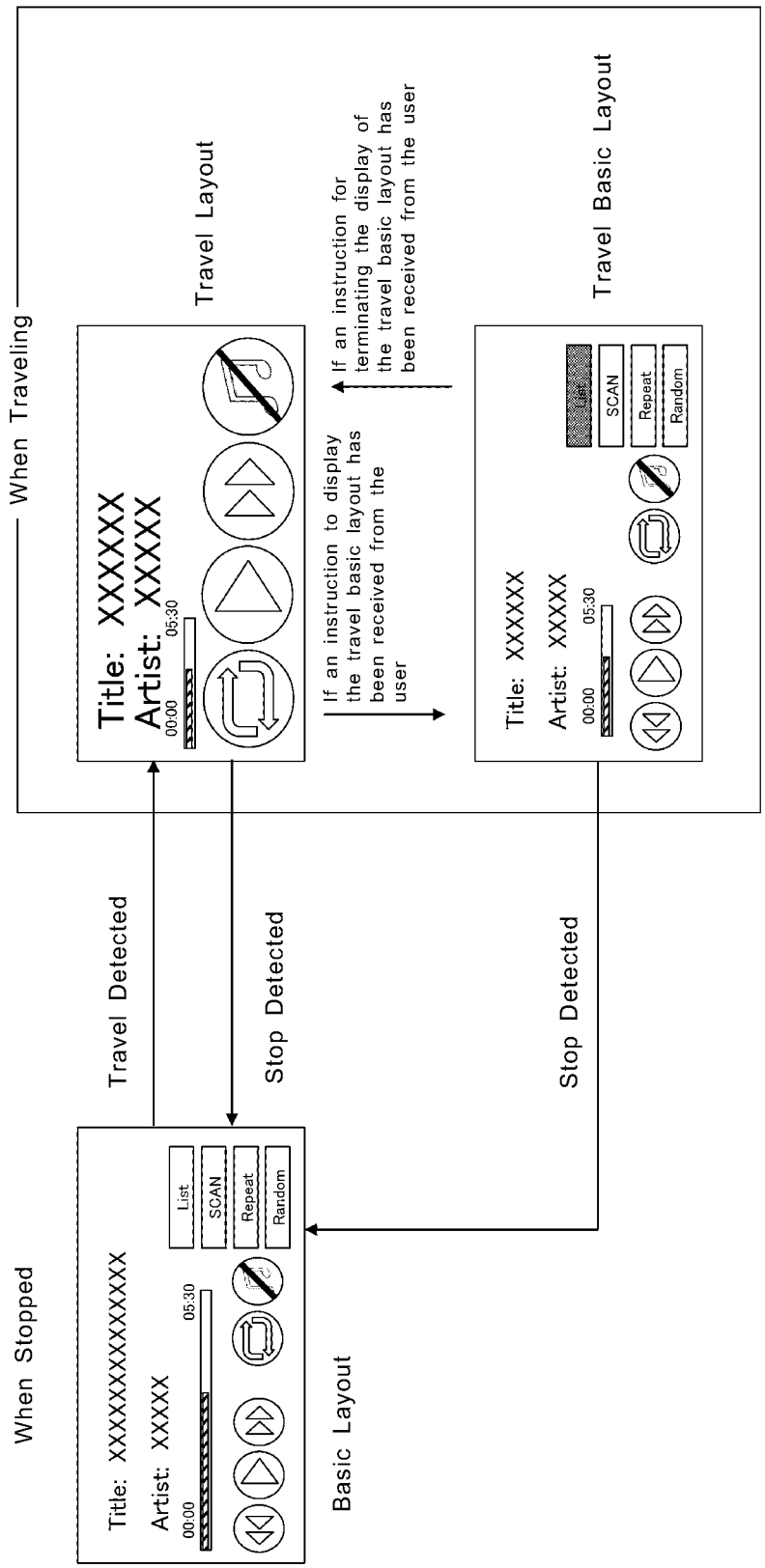
FIG. 3 is a diagram showing an example of screen switching depending on the state of travel.

FIG. 3 is a diagram showing an example of screen switching depending on the state of travel. As illustrated, if the vehicle is stopped, the display information generating unit 115 generates, and displays on the display, screen information following the basic layout. Upon detection that the vehicle is traveling, the display information generating unit 115 generates screen information following the travel layout, displaying the screen information of the travel layout instead of the basic layout. Moreover, if during travel an instruction to display the basic layout is received from a user, the display information generating unit 115 generates screen information following the travel basic layout, and displays, on the display, screen information of the travel basic layout instead of the travel layout. Note that if, while the travel basic layout screen information is displayed, an instruction is received from the user to end the display of the travel basic layout, the display information generating unit 115 generates screen information following the travel layout, and displays, on the display, screen information of the travel layout instead of the travel basic layout. Moreover, upon detection that the vehicle is stopped, the display information generating unit 115 displays, on the display, screen information of the basic layout instead of the travel layout or the travel basic layout.

Note that when generating screen information following the travel layout, the display information generating unit 115 identifies a prescribed number of UI elements (for example, between 4 and 8 UI elements) that have the highest use frequency during travel, and generates screen information wherein the identified UI elements are displayed. The number of UI elements to be displayed in the travel layout may be set (defined) in the layout information 121 for each of the functions that can be used, for example.

The storing unit 120 will be explained next. The storing unit 120 is a functional unit for storing various types of information. Specifically, the storing unit 120 stores layout information 121 and display constraint information 122.

The layout information 121 is information relating to the layout of screen information that is to be displayed on the display. Specifically, the layout information 121 includes basic layouts, travel layouts, and travel basic layouts, corresponding to each of the functions that can be used.

Note that the types of UI elements that are displayed in the layouts are set for the basic layouts and travel basic layouts. On the other hand, the types of UI elements are not set for the travel layout, but rather maximum numbers of UI elements to be displayed in the layouts (for example, between 4 and 8 UI elements) are set.

The display constraint information 122 is information defining the objects for which there are limitations regarding display and user operations during travel, and the details of those limitations, specifically in that the display constraint information 122 defines information that specifies the amounts of text in the character strings that are limited during travel, and the types of UI elements that cannot be used during travel.

The communicating unit 130 is a functional unit for carrying out data exchange with devices and instruments that are outside of the information displaying device 100. Specifically, the communicating unit 130 acquires, through the CAN 200, information indicating that a vehicle speed pulse has been outputted from the vehicle speed sensor. Moreover, the communicating unit 130 acquires input information from the user through the controller 300, which is located in the center console of the vehicle. Moreover, the communicating unit 130 exchanges data with external devices (for example, an information distribution server, or the like) 400 through a communication network N, such as the Internet.

Explanations of Operations

The use frequency counting process and information displaying process by the information displaying device 100 will be explained next.

Figure 4:
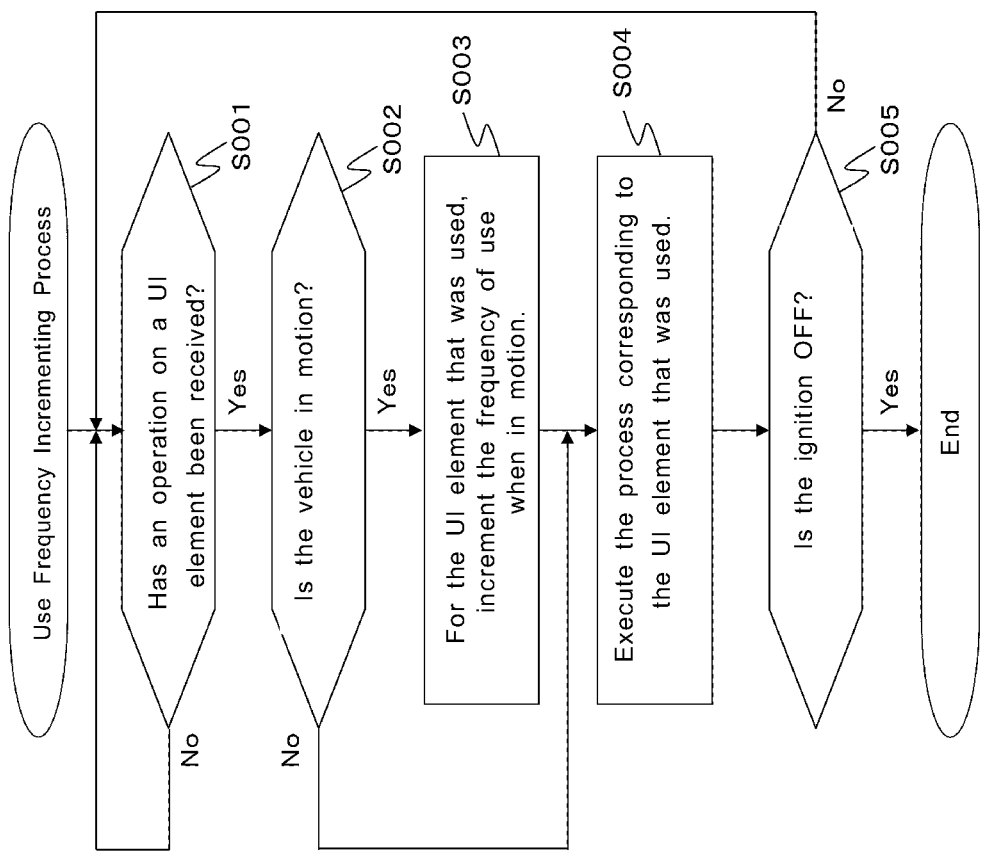
FIG. 4 is a flowchart showing an example of a use frequency counting process.

FIG. 4 is a flowchart showing an example of a use frequency counting process. This process is started when, for example, the information displaying device 100 is started up.

When this process is started, the operation detecting unit 114 evaluates whether or not there has been an operation on a UI element (Step S001). Specifically, if there is a touch panel installed on the display of the information displaying device 100, the operation detecting unit 114 evaluates, based on a touch operation by the user, whether or not there has been a touch operation on a UI element. Moreover, the operation detecting unit 114 evaluates that an operation on a UI element has been received if a UI element has been selected based on operation of a hardware switch provided through the information displaying device 100 or if a UI element has been selected based on an operation through the controller 300.

If the evaluation is that an operation on a UI element has been received (Step S001: YES), the operation detecting unit 114 advances processing to Step S002. On the other hand, if the evaluation is that no operation on a UI element has been received (Step S001: NO), the operation detecting unit 114 executes the procedure in Step S001 again.

Following this, the movement state evaluating unit 113 evaluates whether or not the vehicle is traveling (Step S002). Specifically, the movement state evaluating unit 113 evaluates that the vehicle is traveling if the communicating unit 130 has acquired information, through the CAN 200, indicating that a vehicle speed pulse has been outputted from the vehicle speed sensor.

If the evaluation is that the vehicle is traveling (Step S002: YES), the movement state evaluating unit 113 advances processing to Step S003. On the other hand, if the evaluation is that the vehicle is not in motion (Step S002: NO), the movement state evaluating unit 113 advances processing to Step S004.

In Step S003, the operation detecting unit 114 increments the use frequency that is the frequency with which the UI element that was used (received the operation) has been used during travel. Specifically, the operation detecting unit 114 identifies the UI element that was used, and adds 1 to the use frequency with which the UI element that has been identified has been used during travel. Moreover, the operation detecting unit 114 stores temporarily, in the storing unit 120, the identified UI element and the use frequency that has been incremented.

Note that in Step S004 a process corresponding to the UI element that was used is executed by a prescribed functional unit (not shown), and processing advances to Step S005.

Following this, the overall controlling unit 111 evaluates whether or not the ignition key has gone into the OFF state (Step S005). If the evaluation is that the state is OFF (Step S005: YES), the overall controlling unit 111 terminates the procedure of this flowchart. On the other hand, if the evaluation is that the state is ON (Step S005: NO), the overall controlling unit 111 returns processing to Step S001.

The use frequency counting process has been explained above.

Such a process enables counting of the use frequencies of the UI elements that are used during travel. This makes it possible to identify the UI elements that have the highest use frequency during travel, that is, the UI elements that are to be displayed with priority in the travel layout.

The information displaying process will be explained next.

Figure 5:
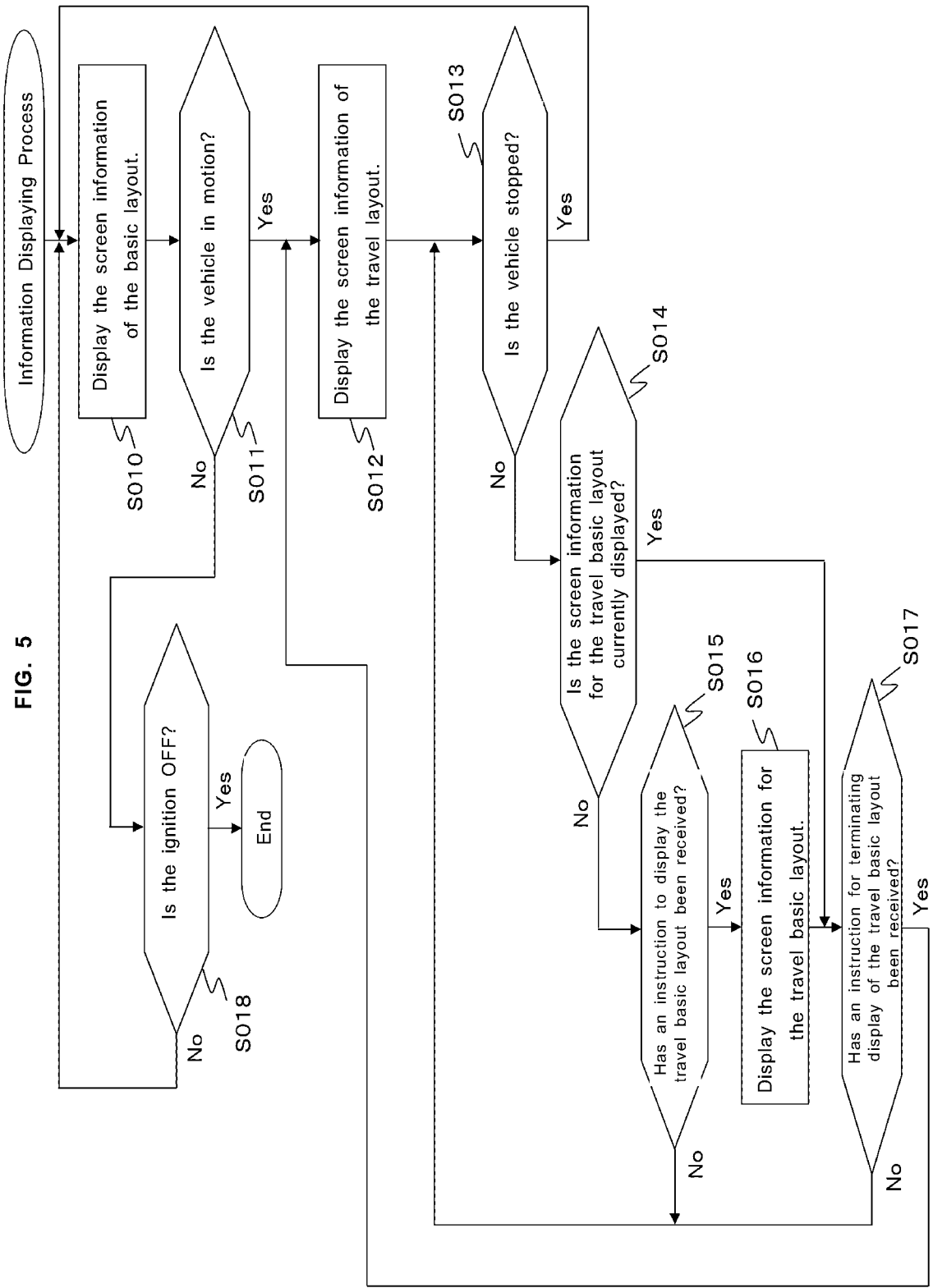
FIG. 5 is a flowchart showing an example of an information displaying process.

FIG. 5 is a flowchart showing an example of the information displaying process. This process is started when, for example, the information displaying device 100 is started up. Note that the information displaying device 100 executes the information displaying process simultaneously with the use frequency counting process, in parallel therewith.

When the process is started, the display information generating unit 115 displays the basic layout (Step S010). Specifically, the display information generating unit 115 identifies, from the layout information 121, the basic layout that corresponds to the functions that can be used, and generates, and displays on the display, screen information based on the basic layout that has been identified.

Following this, the movement state evaluating unit 113 evaluates whether or not the vehicle is traveling (Step S011). Specifically, the movement state evaluating unit 113 evaluates that the vehicle is traveling if the communicating unit 130 has acquired information, through the CAN 200, indicating that a vehicle speed pulse has been outputted from the vehicle speed sensor.

If the evaluation is that the vehicle is traveling (Step S011: YES), the movement state evaluating unit 113 advances processing to Step S012. On the other hand, if the evaluation is that the vehicle is not in motion (Step S011: NO), the movement state evaluating unit 113 advances processing to Step S018. Note that, in Step S018, the overall controlling unit 111 evaluates whether or not the ignition key has gone into the OFF state. If the evaluation is that the state is OFF (Step S018: YES), the overall controlling unit 111 terminates the procedure of this flowchart. On the other hand, if the evaluation is that the state is ON (Step S018: NO), the overall controlling unit 111 returns processing to Step S010.

In Step S012, the display information generating unit 115 displays screen information following the travel layout. Specifically, the display information generating unit 115 identifies, from the layout information 121, the travel layout that corresponds to the functions that can be used, and generates, and displays on the display, screen information following the travel layout that has been identified.

Note that when generating the screen information based on the travel layout, the display information generating unit 115 identifies the UI elements to be displayed in the screen information in the travel layout. Specifically, the display information generating unit 115 uses the identified travel layout to identify the maximum number of UI elements to be displayed in the layout.

Moreover, from the storing unit 120, the display information generating unit 115 identifies, from among the functions that can be used, the prescribed number of UI elements (that is, the maximum number of UI elements to be displayed in the travel layout) that have the highest frequencies of use during travel. Moreover, the display information generating unit 115 generates, and displays on the display, screen information for displaying the identified UI elements following the travel layout.

Note that the order in which the UI elements are lined up in the travel layout may be, for example, arranged prioritized with those that have the highest use frequencies nearer to the center of the screen, which is easier to operate, or may be arranged in an order wherein those with the highest use frequencies are nearer to the right-hand side of the screen (nearer to the driver seat side). There is no particular limitation on the order in which the UI elements are lined up, but rather specific rules should be defined in advance in the layout information 121.

Following this, the movement state evaluating unit 113 evaluates whether or not the vehicle is stopped (Step S013). Specifically, the movement state evaluating unit 113 evaluates whether or not the vehicle is stopped depending on whether or not the communicating unit 130 has acquired information, through the CAN 200, indicating that a vehicle speed pulse has been outputted.

Given this, upon evaluation that the vehicle is stopped (Step S013: YES), the movement state evaluating unit 113 returns processing to Step S010, and displays screen information of the basic layout on the display through the display information generating unit 115.

On the other hand, if the evaluation is that the vehicle is not stopped (Step S013: NO), the movement state evaluating unit 113 advances processing to Step S014.

In Step S014, the display information generating unit 115 evaluates whether or not screen information of the travel basic layout is currently displayed. If the evaluation is that screen information of the travel basic layout is not currently displayed (Step S014: NO), the display information generating unit 115 advances processing to Step S015. On the other hand, if the evaluation is that screen information of the basic layout is currently displayed (Step S014: YES), the display information generating unit 115 advances processing to Step S017. That is, if, in this Step S014, the travel layout screen information is displayed based on the process of Step S012, the evaluation will be NO, and if travel basic layout screen information is displayed based on the process of Step S016, the evaluation will be YES.

In Step S015, the input receiving unit 112 evaluates whether or not a travel basic layout display instruction has been received from the user. Specifically, the input receiving unit 112 evaluates whether or not an instruction to display the travel basic layout has been received from the user through an input device equipped in the information displaying device 100, that is, a touch panel or a hardware switch, or through the controller 300. Note that a UI element for inputting this instruction may be displayed in, for example, the screen information of the travel layout.

Given this, if the evaluation is that no instruction has been received for displaying in the travel basic layout (Step S015: NO), the input receiving unit 112 returns processing to Step S013. On the other hand, if the evaluation is that an instruction for displaying in the travel basic layout has been received (Step S015: YES), the input receiving unit 112 advances processing to Step S016.

In Step S016, the display information generating unit 115 displays, on the display, screen information for the travel basic layout. Specifically, the display information generating unit 115 identifies, from the layout information 121 in the storing unit 120, the travel basic layout for the functions that can be used. Moreover, the display information generating unit 115 references the display constraint information 122 to identify the amount of character string text that can be displayed and the UI elements that cannot be used. Moreover, the display information generating unit 115 generates screen information following the travel basic layout with character strings having the amount of text that can be displayed, and wherein the UI elements that cannot be used are grayed out.

Following this, the input receiving unit 112 evaluates whether or not an instruction has been received from a user to end the display of the travel basic layout (Step S017). Specifically, the input receiving unit 112 evaluates whether or not an instruction to end the display of the travel basic layout has been received from the user through an input device equipped in the information displaying device 100, that is, a touch panel or a hardware switch, or through the controller 300. Note that a UI element for inputting this instruction may be displayed in, for example, the screen information of the travel basic layout.

Given this, if the evaluation is that no instruction has been received for ending the display of the travel basic layout (Step S017: NO), the input receiving unit 112 returns processing to Step S013. On the other hand, if the evaluation is that an instruction for ending the display of the travel basic layout has been received (Step S017: YES), the input receiving unit 112 moves processing to Step S012, and displays screen information following the travel layout.

Additionally, processing returns to Step S013 when the display information generating unit 115 displays the screen information of the travel layout on the screen.

The information displaying process was described above.

An information displaying device such as this enables a further improvement in the ease of use of the UI elements that can be used during travel. In particular, because the information displaying device is able to display with priority, as screen information of the travel layout, the UI elements that have the highest frequency of use when traveling, this can improve the ease of use when traveling. Moreover, because with the travel layout the UI elements are displayed in a size larger than the UI elements that are displayed in the basic layout, this can further improve the ease of use when traveling.

Moreover, in response to an instruction from the user, the information displaying device displays, during travel, a travel basic layout, which can display more UI elements than the UI elements that are displayed in the travel layout; this enables counting of the frequency of use, during travel, of UI elements other than the UI elements displayed in the travel layout. This enables the UI elements that will be displayed in the travel layout to be swapped out, as appropriate, depending on the use frequency of the UI elements that are displayed in the travel basic layout. That is, the UI elements that are displayed in the travel layout are updated constantly depending on the use frequencies during travel, contributing to a further improvement in the ease of use of the UI elements during travel.

Second Embodiment

A second embodiment relates to an information displaying device 100 for a split display wherein the display region of the display is split into a plurality of regions, and display regions for prescribed functions are assigned to each of the split regions.

Figure 6:
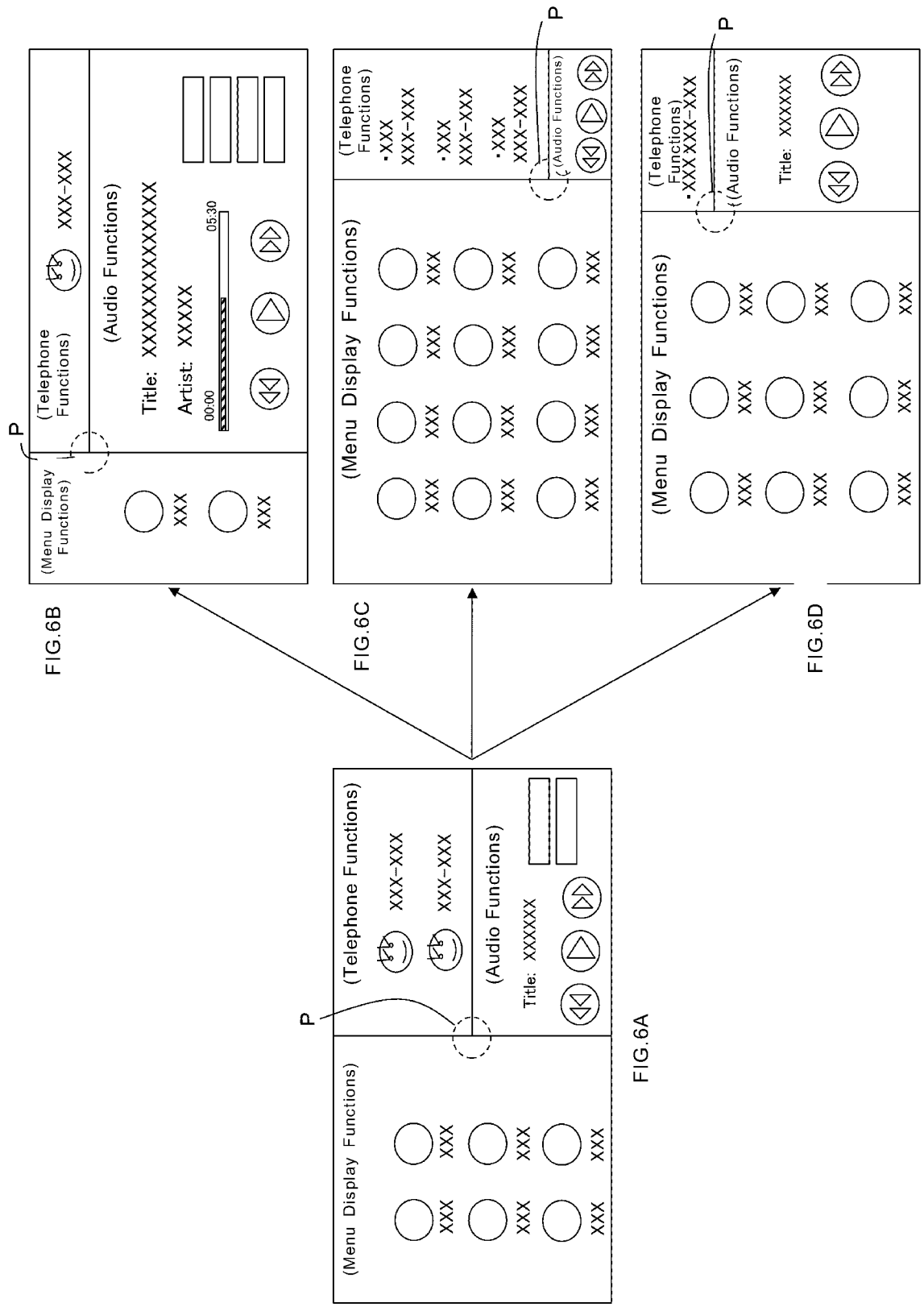

FIG. 6 is a diagram showing an example screen wherein screen information for split regions is displayed. As depicted in FIG. 6A, the input receiving unit 112 receives a touch operation and drag operation on, for example, a point of intersection P of split regions. Moreover, as depicted in FIGS. 6 B through D, the display information generating unit 115 generates, and displays on the display, screen information wherein the shapes and sizes of the split regions are changed so that the point of intersection P of the split regions will be the position on the display (the coordinates) wherein the touch operation on the touch panel is released (ended). Note that the operation for changing the shapes and sizes of the split regions may be received even while traveling.

Additionally, the layout information 121 that is stored in the storing unit 120 includes, for the functions that are assigned to the individual split regions (for example, a menu displaying function, audio functions and telephone functions, and the like), information that defines the correspondence between the sizes and shapes of the split regions and the basic layout, travel layout, and travel basic layout corresponding to each of the sizes and shapes. That is, basic layouts, travel layouts, and travel basic layouts for the corresponding functions are identified depending on the sizes and shapes of the split regions.

To do this, when the display information generating unit 115 generates the screen information to be displayed in a split region, the size and shape is identified for each split region (that is, for each function). Moreover, the display information generating unit 115 generates display information for each split region, depending on the travel state and user instructions, using the basic layouts, travel layouts, and travel basic layouts that correspond to the sizes and shapes identified for the split regions.

Note that because the numbers of UI elements displayed will be proportional to the sizes of the split regions, when the size of a split region is changed so as to be larger, a UI element that had not been displayed up until that point will now be displayed, based on the layout information 121. On the other hand, if the size of the split region is changed so as to be smaller, then, based on the layout information 121, a UI element that had been displayed until that point may no longer be displayed.

Because of this, when there is a change in a split region so as to be larger, a UI element that had not been displayed until that point may be displayed in the split region, and if this is during travel, the use frequency will be counted for use of that UI element as well. The result is that a UI element in the travel layout will be swapped for another UI element in the display.

Note that the movement state evaluating unit 113 and operation detecting unit 114 carry out the same processes as in the first embodiment.

Moreover, the information displaying device 100 according to the present embodiment carries out the use frequency counting process of FIG. 4 and the information displaying process of FIG. 5 in the same manner as in the first embodiment.

An information displaying device 100 according to a second embodiment has been explained above.

An information displaying device such as this enables a further improvement in the ease of use of the UI elements that can be used during travel. Moreover, when, in the information displaying device according to the present embodiment, there is a change in the size of a split region during travel, a UI element that had not been displayed up until that point may be displayed in the split region, and, if this is during travel, the use frequency will be counted for use of that UI element as well. Through this, the information displaying device is able to use effectively the ability to change the size of the split regions, by displaying screen information in the travel layout by taking into account also the use frequency of the UI elements that are displayed by changing the sizes of the split regions. Through this, the information displaying device is able to improve further the ease of use of UI elements by the user during travel.

Note that the present invention is not limited to the first embodiment and a second embodiment, but rather can be modified in a variety of ways within the same inventive concept. For example, the information displaying device 100 related to the first embodiment and second embodiment may instead be configured so as to display UI elements designated by the user in advance in the screen information of the travel layout. Specifically, the information displaying device 100 receives, from the user through the input receiving unit 112, designations for a prescribed number of UI elements (for example, two UI elements) that the user wishes to have displayed in the travel layout.

Moreover, the display information generating unit 115, when generating screen information of the travel layout, specifies the maximum number of UI elements that can be displayed (for example, four UI elements) in a travel layout corresponding to functions that can be used. Moreover, the display information generating unit 115 calculates the difference wherein the number of UI elements designated by the user is subtracted from the specified maximum number of UI elements (which, in this case, is 4−2=2). Additionally, the display information generating unit 115 specifies a number of UI elements commensurate with this calculated difference (that being 2), with those UI elements being the UI elements with the highest use frequency, to display them in the screen information of the travel layout. Note that in this case the two UI elements designated by the user and the two UI elements with the highest frequency of use during travel would be displayed in the screen information of the travel layout.

Through this, the information displaying device 100 is able to improve the usability regarding the ease of use of UI elements.

Moreover, the information displaying device 100 in the first embodiment and second embodiment may increment the use frequency of the UI element that corresponds to the instruction when there is an instruction, during travel, through, for example, voice recognition of an instruction spoken by the user. Specifically, the input receiving unit 112 receives an instruction spoken by the user through a microphone (audio inputting device) that is equipped in the information displaying device 100. A prescribed functional unit (for example, a voice recognizing unit, not shown) performs voice recognition using the spoken information to identify a UI element that is assigned a process that corresponds to the detail of the user instruction. The operation detecting unit 114, upon reception of the instruction through a spoken command by the user during travel, increments the use frequency of the identified UI element. Additionally, the display information generating unit 115 generates screen information following the travel layout based on the use frequency counted in this way. This enables the information displaying device 100 to improve the ease of use of the UI element, doing so more efficiently.

Additionally, if the information displaying device 100 of the first embodiment and second embodiment is a mobile terminal such as a smart phone or tablet terminal, the information displaying device 100 may display, instead of the vehicle travel layout, screen information following a prescribed layout for when the user is walking (a "walking layout") where the user is the mobile entity. Specifically, instead of the states of movement (travel states) of the vehicle being traveling or stopped, as they were identified in the embodiments set forth above, the information displaying device 100 identifies the states of the user (walking states) as walking or standing still, and when the user uses the mobile station while moving (while walking), the use frequency of the UI element that is used is counted. Additionally, when the user is walking, the information displaying device 100 displays, on the display, screen information following the walking layout, which is the layout for when moving, wherein the UI elements with the highest use frequency are displayed with priority. Note that such a process is not limited to the user walking, but may also display the screen information for the walking layout when the user is moving at at least a prescribed speed, such as, for example, when jogging.

An information displaying device such as this enables a further improvement in the ease of use of the UI elements that can be used when walking.

FIG. 7 is a diagram showing an example of a hardware structure for the information displaying device 100. As illustrated, the information displaying device 100 comprises an inputting device 510, an outputting device 520, a processor 530, a main memory 540, an auxiliary storing device 550, a communicating device 560, and a bus 570 for connecting these devices together electrically.

The inputting device 510 is a device for the user to input information or instructions into the information displaying device 100. Depending on the type of device by which the information displaying device 100 is embodied, the inputting device 510 may be a pointing device such as a touch panel or a hardware switch, or an audio inputting device such as a microphone.

The outputting device 520 is a device for outputting (displaying) screen information generated by the information displaying device 100 (display information), or information acquired from an external device 400. The outputting device 520 may be, for example, a display, a speaker, or the like.

The processor 530 is a CPU (Central Processing Unit), for example, for carrying out calculating processes. The main memory 540 is a memory device such as a RAM (Random Access Memory) for storing temporarily various types of information that are read out, a ROM (Read-Only Memory) for storing programs and applications that are to be executed by the CPU, and various other types of information, or the like. The auxiliary storing device 550 is a non-volatile storing device, such as an HDD (Hard Disk Drive) or SSD (Solid State Drive), a flash memory, or the like, able to store digital information.

The communicating device 560 is a device for exchanging data with the external device 400 through the CAN 200, the controller 300 of the center console, or a communication network N such as the Internet. Moreover, the bus 570 is a communication line for connecting these devices together so as to be able to mutually communicate.

The hardware structure of the information displaying device 100 has been explained above.

Note that the processing unit 110 of the information displaying device 100 is achieved through programs that cause the CPU of the processor 530 to carry out processing. These programs are, for example, stored in the main memory 540 or the auxiliary storing device 550, and are loaded into the main memory 540 at run time, and are executed by the CPU. Moreover, the storing unit 120 may be achieved through the main memory 540 or the auxiliary storing device 550, or may be achieved through a combination thereof. The communicating unit 130 may be achieved through the communicating device 560.

Note that each of the functional blocks of the information displaying device 100 have been partitioned depending on their main processes, for ease in understanding the individual functions that are achieved in the embodiments. Consequently, the present invention is not limited to the ways in which the individual functions are partitioned, nor by the names applied thereto. Additionally, each of the individual structures of the information displaying device 100 may be partitioned into a greater number of structural elements depending on the details of processing. Moreover, the partitioning may be such that more processes are carried out by a single structural element.

All or part of each functional unit may be structured through hardware that is mounted into a computer (that is, through an integrated circuit known as an ASIC). The processes in each individual functional unit may be executed by a single hardware element, or executed by a plurality of hardware elements.

Moreover, the present invention is not limited to the embodiments and modified examples set forth above, but rather includes a variety of other embodiments and modified examples. For example, the embodiments set forth above were for explaining the details so as to explain the present invention so as to be easily understood, and there is no limitation to necessarily providing all of the features that were explained. Additionally, a unit of the structures in a given embodiment or modified example may be substituted for the structures in another embodiment, or structures of another embodiment may be added to structures of a given embodiment. Additionally, for some of the structures of each embodiment, additions, omissions, or substitutions of other structures is also possible.

EXPLANATION OF REFERENCE SYMBOLS

100: Information Displaying Device
110: Processing Unit
111: Overall Controlling Unit
112: Input Receiving Unit
113: Movement State Evaluating Unit
114: Operation Detecting Unit
115: Display Information Generating Unit
120: Storing Unit
121: Layout Information
122: Display Constraint Information
130: Communicating Unit
200: CAN (Controller Area Network)
300: Controller
400: External Device
510: Inputting Device
520: Outputting Device
530: Processor
540: Main memory
550: Auxiliary Storing Device
560: Communicating Device
570: Bus
N: Communication Network

The invention claimed is:

1. A vehicle-mounted information displaying device comprising:
an input unit that receives operations from a user;
a movement state evaluating unit that evaluates a state of driving of a vehicle;
a display information generating unit that generates screen information including a plurality of user interface elements to be displayed on a display of the vehicle-mounted information displaying device, based on a layout selected from predetermined layouts according to the state of driving of the vehicle; and
an operation detecting unit that detects the operations on each of the user interface elements, and counts a frequency of the operations on each of the user interface elements in a period that the state of driving is traveling and not when the vehicle is stopped, wherein
the display information generating unit generates the screen information based on a basic layout displaying a first predetermined number of the user interface elements when the vehicle is stopped,
the display information generating unit generates the screen information based on a travel layout when the vehicle is traveling displaying preferentially a second predetermined number of user interface elements with higher frequencies of the operations and less than the first predetermined number on the display;
the display information generating unit generates displays the user interface elements in the travel layout in sizes that are larger than in the screen information based on the basic layout,
the display information generating unit generates the screen information which divides the display into a plurality of divided areas, each of the divided areas are assigned to display a different predetermined function,
the input unit receives an operation to change a plurality of sizes of the divided areas,
the display information generating unit displays a user interface element, which was not displayed prior to the change of the sizes of the divided areas, in the divided area enlarged by the change of its size, and
the operation detecting unit counts the frequency of the operations for each of the user interface elements.

2. The vehicle-mounted information displaying device according to claim 1, wherein:
the input unit receives an operation designating at least one of the user interface elements to be displayed in the screen information based on the travel layout selected when the vehicle is traveling, creating designated one or more user interface elements;
the designated one or more user interface elements are also displayed with the user interface elements with higher frequencies of the operations in the screen information based on the travel layout selected when the vehicle is traveling.

3. The vehicle-mounted information displaying device according to claim 1 further comprising:
a voice recognizing unit that identifies an instruction for one of the user interface elements by analyzing utterance spoken by the user,
wherein, the operation detecting unit also counts the operations for the one of the user interface elements as instructed by the instruction identified by the voice recognizing unit as the operations.

4. The vehicle-mounted information displaying device according to claim 1, wherein:
the user is a person;
the movement state evaluating unit evaluates a state of walking of the person;
the operation detecting unit counts the frequency of the operations on each of the user interface elements in a period that the state of walking is walking, and not when the person is standing still;
wherein, the display information generating unit generates the screen information based on the basic layout displaying a first predetermined number of user interface elements when the person is standing still;

the screen information based on a walking layout when the person is in the state of walking displaying preferentially a second predetermined number of user interface elements with higher frequencies of the operations and less than the first predetermined number of user interface elements on the display; and displays the user interface elements in the walking layout in sizes that are larger than in the screen information based on the basic layout.

5. The vehicle-mounted information displaying device according to claim 1, wherein:

a user interface included in the basic layout is displayed while the vehicle is stopped;

wherein, a basic travel layout, including the user interface elements that were not displayed in the travel layout, is displayed during traveling based on a user instruction.

6. The vehicle-mounted information displaying device according to claim 1, wherein the operation detecting unit:

evaluates, for each of the user interface elements, whether at least one new operation of the operations has occurred;

determines if the vehicle is traveling, on a condition that the vehicle is stopped, maintain the basic layout, and execute the at least one new operation, and on a condition that the vehicle is traveling, count, for each of the user interface elements, the frequency of the at least one new operation that occurs during the period that the state of driving is traveling, add, for each of the user interface elements, a counted amount based on the frequency of the at least one new operation to create an updated frequency, store, for each of the user interface elements, the updated frequency in a storing unit, identify, using the second predetermined number, identified user interface elements from the user interface elements having a highest number of frequencies based on the updated frequency, and display an updated travel layout with the identified user interface elements, and execute the at least one new operation.

7. A method for displaying information on a vehicle-mounted information displaying device, comprising the steps of:

receiving operations from a user;

evaluating a state of driving of a vehicle;

generating screen information including a plurality of user interface elements to be displayed on a display of the information displaying device, based on a layout selected from predetermined layouts according to the state of driving of the vehicle; and counting a frequency of the operations on each of the user interface elements by detecting the operations on each of the user interface elements in a period that the state of driving is traveling and not when the vehicle is stopped, wherein generating the screen information based on a basic layout displaying a first predetermined number of user interface elements is performed when the vehicle is stopped, generating the screen information based on a travel layout is performed when the vehicle is traveling displaying preferentially a second predetermined number of user interface elements with higher frequencies of the operations and less than the first predetermined number of user interface elements on the display, displaying the user interface elements in the travel layout in sizes that are larger than in the screen information based on the basic layout, generating the screen information which divides the display into a plurality of divided areas, each of the divided areas are assigned to display a different predetermined function, receiving an operation to change a plurality of sizes of the divided areas;

displaying a user interface element, which was not displayed prior to the change of the sizes of the divided areas, in the divided area enlarged by the change of its size, and counting the frequency of the operations on each of the user interface elements.

* * * * *